(12) United States Patent
Nishimura et al.

(10) Patent No.: US 11,663,834 B2
(45) Date of Patent: May 30, 2023

(54) TRAFFIC SIGNAL RECOGNITION METHOD AND TRAFFIC SIGNAL RECOGNITION DEVICE

(71) Applicant: Nissan Motor Co., Ltd., Yokohama (JP)

(72) Inventors: Toshihiko Nishimura, Kanagawa (JP); Haruo Matsuo, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 17/775,528

(22) PCT Filed: Nov. 12, 2019

(86) PCT No.: PCT/IB2019/001270
§ 371 (c)(1),
(2) Date: May 9, 2022

(87) PCT Pub. No.: WO2021/094800
PCT Pub. Date: May 20, 2021

(65) Prior Publication Data
US 2022/0398853 A1 Dec. 15, 2022

(51) Int. Cl.
*G06V 20/58* (2022.01)
(52) U.S. Cl.
CPC ................. *G06V 20/584* (2022.01)
(58) Field of Classification Search
CPC . G06V 20/584; G08G 1/096855; G08G 1/095
See application file for complete search history.

(56) References Cited

U.S. PATENT DOCUMENTS

| | | | | |
|---|---|---|---|---|
| 2017/0024622 A1* | 1/2017 | Mizutani | ............... | G06V 20/584 |
| 2017/0024623 A1* | 1/2017 | Mizutani | ............... | G06V 10/22 |
| 2017/0177955 A1* | 6/2017 | Yokota | ................... | G01S 13/931 |
| 2017/0337435 A1* | 11/2017 | Uliyar | ................... | G06K 9/6277 |
| 2019/0122059 A1* | 4/2019 | Zhou | ................... | G06V 20/584 |

(Continued)

FOREIGN PATENT DOCUMENTS

| | | |
|---|---|---|
| JP | 2015-170240 A | 9/2015 |
| JP | 6228492 B2 | 11/2017 |
| JP | 2019-109602 A | 7/2019 |

*Primary Examiner* — Santiago Garcia
(74) *Attorney, Agent, or Firm* — Young Basile Hanlon & MacFarlane, P.C.

(57) ABSTRACT

A traffic signal recognition method and a traffic signal recognition device acquire a result sequence consisting of a plurality of determination results in time-series order obtained by determining a display state of a traffic signal based on a plurality of images of a traveling direction of a vehicle, set a first threshold as a number threshold if a specific determination result which is a latest determination result among the determination results is a determination result of a permission display that allows a passage of the stop line corresponding to the traffic signal, set a second threshold smaller than the first threshold as the number threshold if the specific determination result is other than a determination result of the permission display, and output the specific determination result if a number of determination results identical to the specific determination result is greater than the number threshold.

7 Claims, 6 Drawing Sheets

(56) References Cited

U.S. PATENT DOCUMENTS

2020/0393264 A1* 12/2020 Fukazawa .............. G02B 27/01
2021/0027076 A1* 1/2021 Hayashi ............. G08G 1/09623
2021/0064894 A1* 3/2021 Ikezawa ................ G08G 1/166
2021/0078407 A1* 3/2021 Kim ....................... B60K 35/00

* cited by examiner

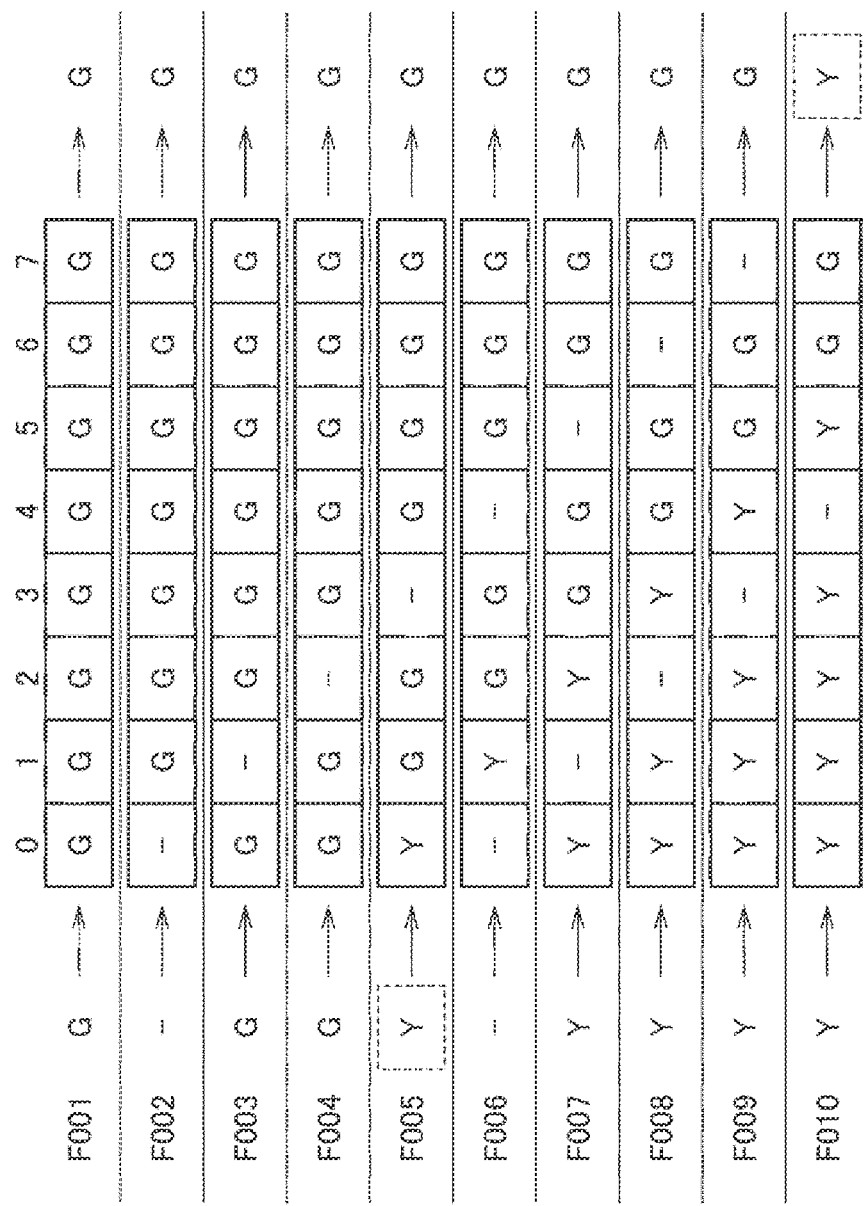

FIG. 5B

TRAFFIC SIGNAL RECOGNITION METHOD AND TRAFFIC SIGNAL RECOGNITION DEVICE

TECHNICAL FIELD

The disclosure relates to a traffic signal recognition method and a traffic signal recognition device.

BACKGROUND

According to Patent Publication No. 6228492, in order to avoid a situation in which a traffic signal controlled to be lit is erroneously determined to be controlled to be turned off or blinking, a technique is proposed which determines that the traffic signal is turned off or blinking based on whether or not the number of captured images determined that the traffic signal is off, among a predetermined number of consecutive captured images, exceeds a threshold.

SUMMARY

However, according to the technique described in Patent Publication No. 6228492, if a display state of the traffic signal is determined by referring to a plurality of images arranged in time-series order in order to improve the accuracy of image recognition, there is a delay time between the actual transition of the light indication of the traffic signal and the start of the process corresponding to the light indication after the transition when the light indication transitions from a "green signal" (a color signal that means "the vehicle can proceed") to a color signal other than "green signal".

The disclosure has been made in view of the above problems, and an object of the disclosure is to provide a traffic signal recognition method and a traffic signal recognition device capable of determining a display state of the traffic signal by referring to a plurality of images arranged in time-series order and recognizing the traffic signal, while suppressing a delay time from the actual transition of the display state of the traffic signal to the start of processing corresponding to the display state after the transition.

In order to solve the above problems, a traffic signal recognition method and a traffic signal recognition device according to an aspect of the disclosure acquire a result sequence consisting of a plurality of determination results in time-series order obtained by determining a display state of a traffic signal based on a plurality of images of a traveling direction of a vehicle, set a first threshold as a number threshold if a specific determination result which is a latest determination result among the determination results constituting the result sequence is a determination result that the display state is a permission display that allows a passage of the stop line corresponding to the traffic signal, set a second threshold smaller than the first threshold as the number threshold if the specific determination result is other than a determination result that the display state is the permission display, and output the specific determination result if a number of determination results identical to the specific determination result is greater than the number threshold.

According to the disclosure, it is possible to determine a display state of the traffic signal by referring to a plurality of images arranged in time-series order and recognizing the traffic signal, while suppressing a delay time from the actual transition of the display state of the traffic signal to the start of processing corresponding to the display state after the transition.

BRIEF DESCRIPTION OF THE DRAWINGS

FIG. 5A is a diagram illustrating a first example of a change in an output value corresponding to the result sequence; and FIG. 5B is a diagram illustrating a second example of a change in an output value corresponding to the result sequence.

DETAILED DESCRIPTION

Figure 1:
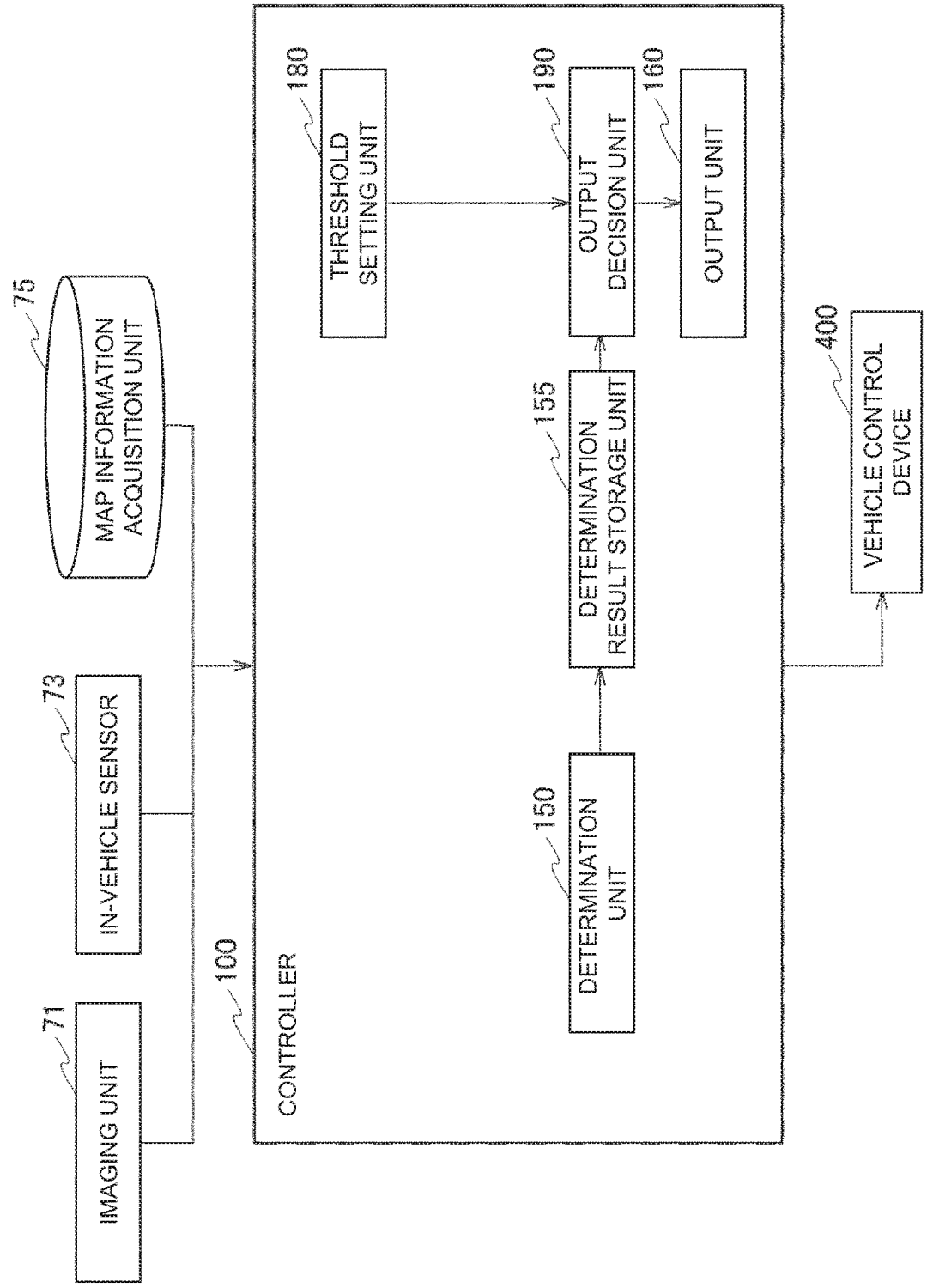
FIG. 1 is a block diagram illustrating a configuration of a traffic signal recognition device according to an embodiment of the disclosure.

Next, embodiments of the disclosure will be described in detail with reference to the drawings. In the description, the same items are designated by the same reference numerals and duplicate description will be omitted.

[Configuration of Traffic Signal Recognition Device]

FIG. 1 is a block diagram illustrating a configuration of a traffic signal recognition device according to the present embodiment. As shown in FIG. 1, the traffic signal recognition device according to the present embodiment includes an imaging unit 71 and a controller 100, and the controller 100 is connected to an imaging unit 71, an in-vehicle sensor 73, a map information acquisition unit 75, and a vehicle control device 400, by a wired or wireless communication path.

Here, the imaging unit 71, the in-vehicle sensor 73, and the vehicle control device 400 are mounted on a vehicle (not shown), but the map information acquisition unit 75 and the controller 100 may be mounted on the vehicle or may be installed outside the vehicle.

The imaging unit 71 captures an image of the vehicle in the traveling direction. For example, the imaging unit 71 is a digital camera provided with a solid-state image sensor such as a CCD or CMOS, and images the surroundings of the vehicle to capture a digital image of the peripheral region of the vehicle. The imaging unit 71 images a predetermined range around the vehicle by setting the focal length, the angle of view of the lens, the vertical and horizontal angles of the camera, and the like.

The image captured by the imaging unit 71 is output to the controller 100 and stored in a storage unit (not shown) for a predetermined period of time. For example, the imaging unit 71 captures images at predetermined time intervals, and the images captured at predetermined time intervals are stored in the storage unit as past images. The past image may be deleted after a predetermined period has elapsed from the time when the past image was captured.

The in-vehicle sensor 73 includes an object detection sensor mounted on the vehicle, such as a laser radar, a millimeter wave radar, and a camera, which detects an object existing around the vehicle. The in-vehicle sensor 73 may include a plurality of different types of object detection sensors.

The in-vehicle sensor 73 detects the environment around the vehicle. For example, the in-vehicle sensor 73 may detect a moving object including another vehicle, a motorcycle, a bicycle, a pedestrian, and a stationary object including a stopped vehicle, and the position, posture, size, speed, acceleration, deceleration, and yaw rate, etc. of the moving object and the stationary object with respect to the vehicle. The in-vehicle sensor 73 may output, for example, the behavior of a two-dimensional object in a zenith view (also referred to as a plan view) viewed from the air above the vehicle as a detection result.

Further, the in-vehicle sensor 73 may detect a sign (a road sign or a sign displayed on the road surface), a guide rail, or the like existing around the vehicle. In addition, the in-vehicle sensor 73 may detect the slipperiness of the road surface in the lane in which the vehicle is traveling by detecting the rotation speed and the difference in rotation speed of the wheels provided in the vehicle.

Further, the in-vehicle sensor 73 detects the state of the vehicle in addition to the environment around the vehicle. For example, the in-vehicle sensor 73 may detect the moving speed of the vehicle (moving speed in the front-rear direction, left-right direction, turning speed), the steering angle of the wheels provided in the vehicle, and the changing speed of the steering angle.

In addition, the in-vehicle sensor 73 may measure an absolute position of the vehicle, that is, the position, attitude and speed of the vehicle relative to a given reference point, by using a position detection sensor that measures the absolute position of the vehicle, such as GPS (Global Positioning System) and odometry.

The map information acquisition unit 75 acquires map information indicating the structure of the road on which the vehicle travels. The map information acquired by the map information acquisition unit 75 includes road structure information such as absolute lane positions, lane connection relationships, and relative positional relationships. Further, the map information acquired by the map information acquisition unit 75 may include facility information such as a parking lot and a gas station. In addition, the map information may include the position information of the traffic signal, the type of the traffic signal, the position of the stop line corresponding to the traffic signal, and the like. The map information acquisition unit 75 may own a map database that stores the map information, or may acquire the map information from an external map data server by cloud computing. Further, the map information acquisition unit 75 may acquire map information by using vehicle-to-vehicle communication and road-to-vehicle communication.

The vehicle control device 400 controls a vehicle (not shown) based on the recognition result of the traffic signal obtained by the controller 100. For example, the vehicle control device 400 may drive the vehicle by automatic driving according to a predetermined traveling route, or may support the driving operation of the occupants of the vehicle. In addition, the vehicle control device 400 may be a notification device that notifies the occupants of the vehicle of the recognition result of the traffic signal.

The controller 100 (an example of a control unit or a processing unit) is a general-purpose microcomputer including a CPU (central processing unit), a memory, and an input/output unit. A computer program (traffic signal recognition program) for functioning as a traffic signal recognition device is installed in the controller 100. By executing the computer program, the controller 100 functions as a plurality of information processing circuits (150, 155, 160, 180, 190) included in the traffic signal recognition device.

Here, an example is shown in which a plurality of information processing circuits (150, 155, 160, 180, 190) included in the traffic signal recognition device are realized by software. However, it is also possible to configure information processing circuits (150, 155, 160, 180, 190) by preparing dedicated hardware for executing each of the following information processing. Further, the plurality of information processing circuits (150, 155, 160, 180, 190) may be configured by individual hardware. Further, the information processing circuit (150, 155, 160, 180, 190) may also be used as an electronic control unit (ECU) used for other control related to the vehicle.

The controller 100, as a plurality of information processing circuits (150, 155, 160, 180, 190), includes a determination unit 150, a determination result storage unit 155, a threshold setting unit 180, an output decision unit 190, and an output unit 160.

The determination unit 150 sets the detection area corresponding to the traffic signal on the image captured by the imaging unit 71. Here, the "detection area" means an area in the image where a traffic signal is presumed to be present. The position of the traffic signal reflected in the imaging range in the image can be estimated based on the imaging direction of the imaging unit 71, the position and orientation of the vehicle at the time of imaging, and the position of the traffic signal. The determination unit 150 sets, for example, a partial region of the captured image as the detection area, the region including the estimated position of the traffic signal in the image.

The determination unit 150 executes image processing on the detection area, detects the traffic signal in the detection area, and determines the display state of the traffic signal. The determination unit 150 detects a traffic signal by, for example, template matching. In template matching, a standard traffic signal image is used as a template, and the detection area is scanned while shifting the image one pixel at a time, and for example, the correlation of the brightness distribution is calculated. Then, when the correlation becomes the highest value, it is detected that the traffic signal is at the position on the image where the template is located.

The "color signal" indicated by the traffic signal includes a "green signal", a "yellow signal", and a "red signal". The meaning of "color signal" is determined by the traffic regulations that the vehicle should follow. For example, "green signal" means "may proceed" and "red signal" means "stop at the stop position". The "yellow signal" means "stop at the stop position unless it is not possible to stop safely because it is close to the stop position".

Such discrimination of "green signal", "yellow signal", and "red signal" may be performed such that it is estimated that the "color signal" having the highest luminance level among the three "color signals" is lit.

In addition, the traffic signal may indicate not only a "color signal" but also an "arrow signal" indicating a direction permitted to the vehicle at an intersection where the traffic signal is installed. For example, the "arrow signal" is a "right turn signal", a "straight ahead signal", and/or a "left turn signal".

The "arrow signal" is not limited to the "right turn signal", "straight ahead signal", and "left turn signal", and various variations can be considered depending on the structure of the intersection where the traffic signal is installed. The meaning of the "arrow signal" is determined by the traffic regulations that the vehicle should obey.

The determination unit 150 executes image processing on the detection area and determines a lighting state of the "color signal" and the "arrow signal" of the traffic signal as the display state of the traffic signal.

The image processing of the traffic signal detection by the determination unit 150 may use machine learning such as a support vector machine or a neural network. When detecting a traffic signal, the recognition rate can be improved by preparing a learning database in which templates of traffic signals of different sizes are stored in advance and using the learning database to be referred to according to the distance to the traffic signal.

The determination result storage unit 155 stores the display state of the traffic signal determined by the determination unit 150. Specifically, the determination unit 150 sequentially determines the plurality of images acquired by the imaging unit 71 in time-series order, and the determination result storage unit 155 sequentially gets the obtained determination results from the determination unit 150. Then, the determination result storage unit 155 stores a plurality of determination results in time-series order as a result sequence.

Figure 4:
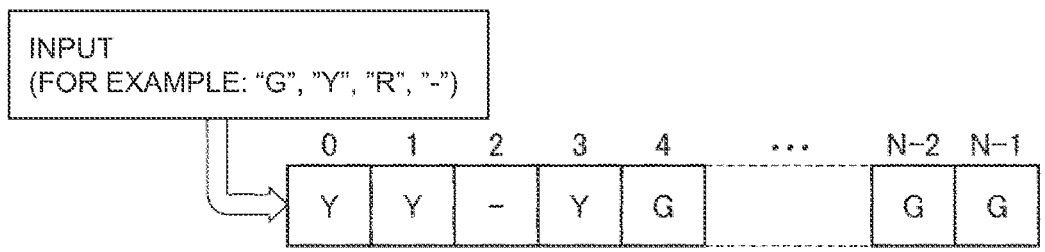
FIG. 4 is a diagram illustrating an example of a result sequence composed of a plurality of determination results in time-series order.

The structure of the result sequence stored by the determination result storage unit 155 will be described with reference to FIG. 4. FIG. 4 is a diagram illustrating an example of the result sequence composed of a plurality of determination results in time-series order. In the following, for the sake of simplification of the explanation, it is assumed that there are four types of the determination results obtained by the determination unit 150, and four types are "green signal", "yellow signal", "red signal", and "unknown" (determination result that the display state is unknown). In FIG. 4, the determination results "green signal", "yellow signal", "red signal", and "unknown" are indicated by symbols "G", "Y", "R", and "-", respectively.

The reason why the determination result by the determination unit 150 is "unknown" is, for example, that the traffic signal flickers, due to the flicker phenomenon in which the brightness in the captured image changes depending on the imaging timing by the imaging unit 71 when the traffic signal lamp is a lamp that blinks periodically like an LED lamp, and/or due to the rolling shutter phenomenon in which the imaging timing shifts for each position in the captured image due to the imaging method in the imaging unit 71.

A number N of determination results stored by the determination result storage unit 155 is preset. That is, the number N of the determination results constituting the result sequence is preset as a predetermined number larger than a number threshold NC.

Subscripts from 0 to N−1 are assigned to each of the N determination results stored by the determination result storage unit 155. Here, the determination result of the subscript 0 is the latest determination result obtained by the determination unit 150, and as the number of subscripts assigned to the determination result increases, the determination result becomes older in order.

When one new determination result is input to the determination result storage unit 155, the determination result storage unit 155 increases the subscript given to the determination result by 1, and adds subscript 0 to the new determination result input to the determination result storage unit 155. The determination result in which the subscript is N is deleted.

In this way, the determination result storage unit 155 stores the determination results with subscripts from 0 to N−1 as the result sequence.

In addition, the determination result storage unit 155 may have a determination result complementing function. Specifically, in a case where "unknown" is included in the determination results constituting the result sequence stored in the determination result storage unit 155, the "unknown" determination result may be replaced based on the determination result immediately before the "unknown" and the determination result immediately after the "unknown".

For example, in the result sequence shown in FIG. 4, the determination result of the subscript 2 is "unknown". In this case, the determination result storage unit 155 refers to the determination result of the subscript 3 immediately before the determination result of the subscript 2 and the determination result of the subscript 1 immediately after the determination result of the subscript 2. The determination result of the subscript 1 and the determination result of the subscript 3 are both "yellow signal". Therefore, the determination result of the subscript 2 may be replaced from "unknown" and may become a "yellow signal" which is the determination result of the subscript 3 immediately before the determination result of the subscript 2.

In this way, the determination result storage unit 155 may extract the determination result that the display state is unknown from the determination results constituting the result sequence as the first determination result. The determination result storage unit 155 may extract a determination result immediately before the first determination result and a determination result immediately after the first determination result among the determination results constituting the result sequence excluding the determination results that the display state is unknown as a second determination result and a third determination result respectively. The determination result storage unit 155 may replace the first determination result in the result sequence with the second determination result in a case where the second determination result is identical to the third determination result.

In a situation where the determination unit 150 cannot determine the display state of the traffic signal due to the flicker of the traffic signal, the above-mentioned determination result complementing function by the determination result storage unit 155 is effective for improving the recognition accuracy of the traffic signal.

In the above description, it has been described that the number of determination results stored in the determination result storage unit 155 is N, but the disclosure is not limited to this.

For example, the determination result storage unit 155 may determine whether or not to store the determination result based on an imaging time of the image that is the source of the determination result, instead of the number of determination results. More specifically, the determination result storage unit 155 may erase the determination result corresponding to the captured image in which a predetermined time or more has passed since the image was taken, and the determination result stored in the determination result storage unit 155 may be only those corresponding to the images captured from the present to the past for the predetermined time.

In a case where the imaging unit 71 captures images at a predetermined interval, the result when the number of determination results stored in the determination result storage unit 155 is limited based on the number N is same as the result when the number of determination results is limited based on the predetermined time.

On the other hand, in a case where the imaging unit 71 captures images at an unspecified timing other than the predetermined interval, the result may change depending on whether the image is limited based on the number N or the predetermined time. However, regardless of whether the number of determination results to be stored is limited based on the number N or the predetermined time, it can be adopted as the configuration of the determination result storage unit 155.

The threshold setting unit 180 sets the number threshold NC, which is a value used in the output decision unit 190 described later, based on the display state of the traffic signal (threshold setting process). The number threshold NC is set to a predetermined initial value when the controller 100 is started for the first time, and is subsequently updated by the threshold setting unit 180.

Specifically, the threshold setting unit 180 refers to a latest determination result among the determination results constituting the result sequence stored in the determination result storage unit 155. In a case where the latest determination result is a determination result that the display state is a permission display ("green signal") that allows a passage of the stop line corresponding to the traffic signal, the threshold setting unit 180 sets a first threshold as the number threshold NC. In a case where the latest determination result is other than a determination result that the display state is the permission display, the threshold setting unit 180 sets a second threshold smaller than the first threshold as the number threshold NC.

In addition, the threshold setting unit 180 may set the number threshold NC based on whether the latest determination result is a prohibition display ("red signal") that prohibits the passage of the stop line, or an intermediate display ("yellow signal") displayed after the permission display and before the prohibition display.

For example, the threshold setting unit 180 may set a third threshold smaller than the first threshold as the number threshold NC in a case where the latest determination result is a determination result that the display state is the prohibition display. Further, the threshold setting unit 180 may set a second threshold smaller than the third threshold set in the case of the prohibition display as the number threshold NC, in a case where the latest determination result is a determination result that the display state is the intermediate display.

Note that the first threshold, the second threshold, and the third threshold may be determined based on the performance of the imaging unit 71, the length of the result sequence held by the determination result storage unit 155, the imaging cycle of the imaging unit 71, and the like.

Further, in a case where the determination unit 150 determines that the traffic signal is not lit (in a case where the latest determination result by the determination unit 150 is a determination result that the display state is unknown), the threshold setting unit 180 may maintain the value of the number threshold NC that has already been set without setting the number threshold NC.

The threshold setting unit 180 resets the number threshold NC to the initial value after the vehicle passes the stop line corresponding to the target traffic signal.

The output decision unit 190 determines the output value based on the number threshold NC set by the threshold setting unit 180 and the result sequence stored in the determination result storage unit 155. Specifically, the output decision unit 190 sets the determination result of subscript 0 as the output value in a case where the number of determination results that are the same as the latest determination result (determination result of subscript 0) among the determination results constituting the result sequence is larger than the number threshold NC.

Note that the output decision unit 190 may maintain the output value as the previous output value in a case where the number of determination results that are the same as the latest determination result (determination result of subscript 0) among the determination results constituting the result sequence is equal to or less than the number threshold NC.

The state of determination of the output value by the output decision unit 190 will be described with reference to FIG. 5A. FIG. 5A is a diagram illustrating a first example of a change in an output value corresponding to the result sequence.

In FIG. 5A, it is assumed that the number N of the determination results constituting the result sequence is 8 and the number threshold NC is 4. Further, it is assumed that the images acquired by the imaging unit 71 are from frame F001 to frame F010 in time-series order, and the determination result by the determination unit 150 is obtained for each frame. Further, in the example shown in FIG. 5A, it is assumed that the determination result complementing function by the determination result storage unit 155 is disabled.

In FIG. 5A, for example, referring to the row of frame F001, the display of "G" on the left side of the result sequence means that the determination result of the determination unit 150 with respect to frame F001 is "green signal". Further, the display of "G" on the right side of the result sequence means that the output value determined by the output decision unit 190 is "green signal" when the determination result of the frame F001 is input to the result sequence. The other frames F002 to F010 are also displayed in the same manner.

It is assumed that the display state of the traffic signal was a green signal at the time of imaging of the frame F004, but changed to a yellow signal at the time of imaging of the frame F005. In this case, as shown in the row of frame F005 in FIG. 5A, the number of determination results that are the same as the determination result "Y" in the result sequence is 1, which is a value equal to or less than the number threshold NC. Therefore, the output decision unit 190 maintains the output value as the "green signal" which is the immediately preceding output value.

In FIG. 5A, the output value determined by the output decision unit 190 changes from the "green signal" to the "yellow signal" at the time of frame F010. With reference to the row of frame F010 in FIG. 5A, the number of determination results that are the same as the determination result "Y" in the result sequence is 5, which is larger than the number threshold NC. Therefore, the output decision unit 190 sets the output value as the "yellow signal" at the time of frame F010.

In the example shown in FIG. 5A, there is a time delay of 5 frames from the actual change of the display state of the traffic signal to the change of the output value by the output decision unit 190. The distance traveled by the vehicle during the time delay is the free running distance of the vehicle.

Figure 5B:
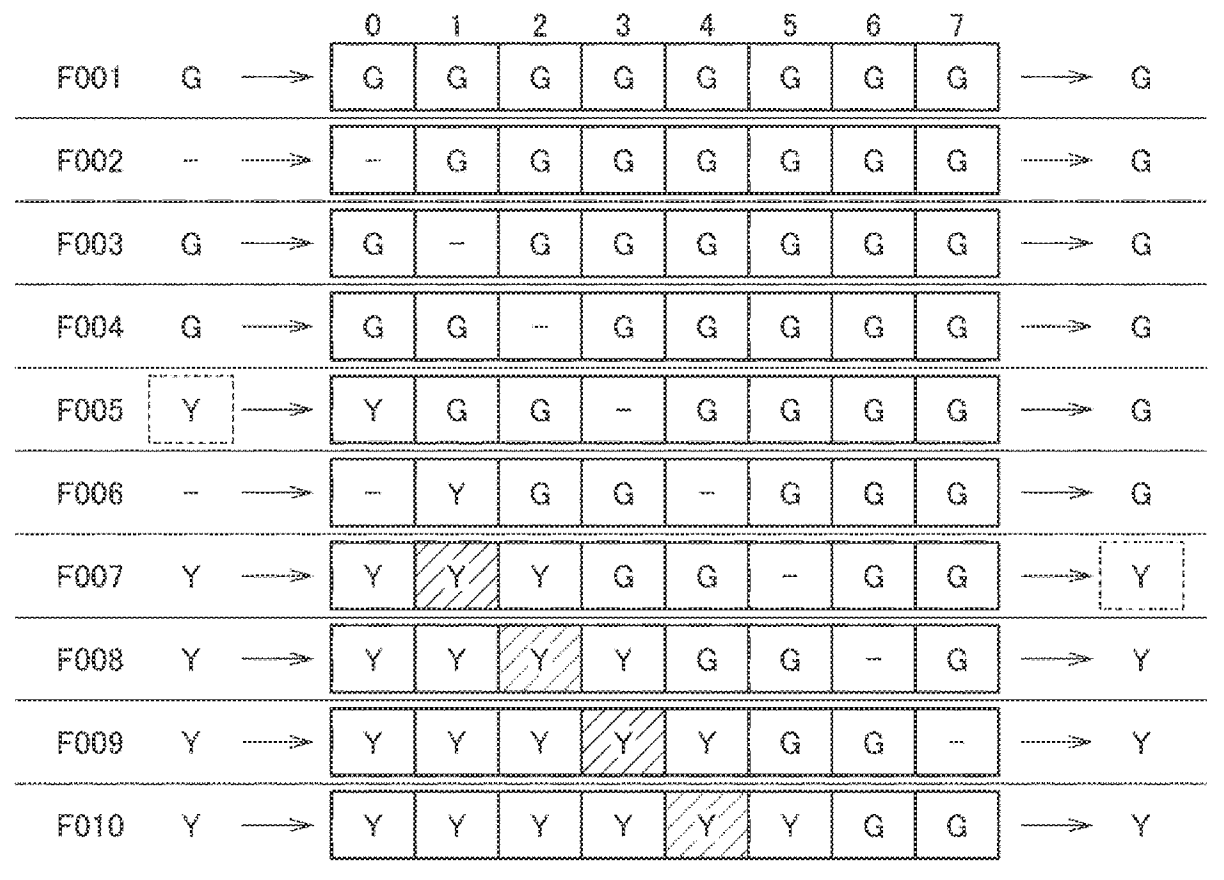

It will be described with reference to FIG. 5B that the smaller the set number threshold NC is, the smaller the time delay from the actual change of the display state of the traffic signal to the change of the output value. FIG. 5B is a diagram illustrating a second example of a change in an output value corresponding to the result sequence.

In the example shown in FIG. 5B, unlike the example shown in FIG. 5A, the number threshold NC is assumed to be 2. In FIG. 5B, the output value determined by the output decision unit 190 changes from the "green signal" to the "yellow signal" at the time of frame F008. In this case, the time delay from the actual change of the display state of the traffic signal to the change of the output value is 3 frames.

Further, in FIG. 5B, assuming that the determination result complementing function by the determination result storage unit 155 is enabled, when the determination result for the frame F007 is stored in the determination result storage unit 155, the complementation for the determination result of the subscript 1 is performed, and the determination result of the subscript 1 changes from "unknown" to "yellow signal". As a result, the output value determined by the output decision unit 190 changes from the "green signal" to the "yellow signal" at the time of frame F007. In this case, the time delay from the actual change of the display state of the traffic signal to the change of the output value is two frames.

As described above, in order to reduce the time delay from the actual change of the display state of the traffic signal to the change of the output value and shorten the free running distance, it is desirable to reduce the number threshold NC. On the other hand, in order to improve the recognition accuracy of the traffic signal, it is desirable to increase the number threshold NC. That is, there is a trade-off relationship between improving the recognition accuracy of the traffic signal and reducing the time delay to shorten the free running distance. Therefore, in order to shorten the free running distance, it is desirable that the threshold setting unit 180 sets the number threshold NC when the vehicle is close to the stop line smaller than the number threshold NC set when the vehicle is far from the stop line. Further, when the display state of the traffic signal is a yellow signal or a red signal as compared with the case where the display state of the traffic signal is a green signal, it is desirable that the threshold setting unit 180 sets the number threshold NC smaller in order to shorten the free running distance.

The output unit 160 outputs the output value determined by the output decision unit 190 as the display state of the traffic signal. For example, the display state of the traffic signal is output from the output unit 160 to the vehicle control device 400 and used for controlling the vehicle. In addition, the display state of the traffic signal may be output from the output unit 160 to a notification device (not shown) and notified to the occupant via the notification device.

[Processing Procedure of Traffic Signal Recognition Device]

Figure 2:
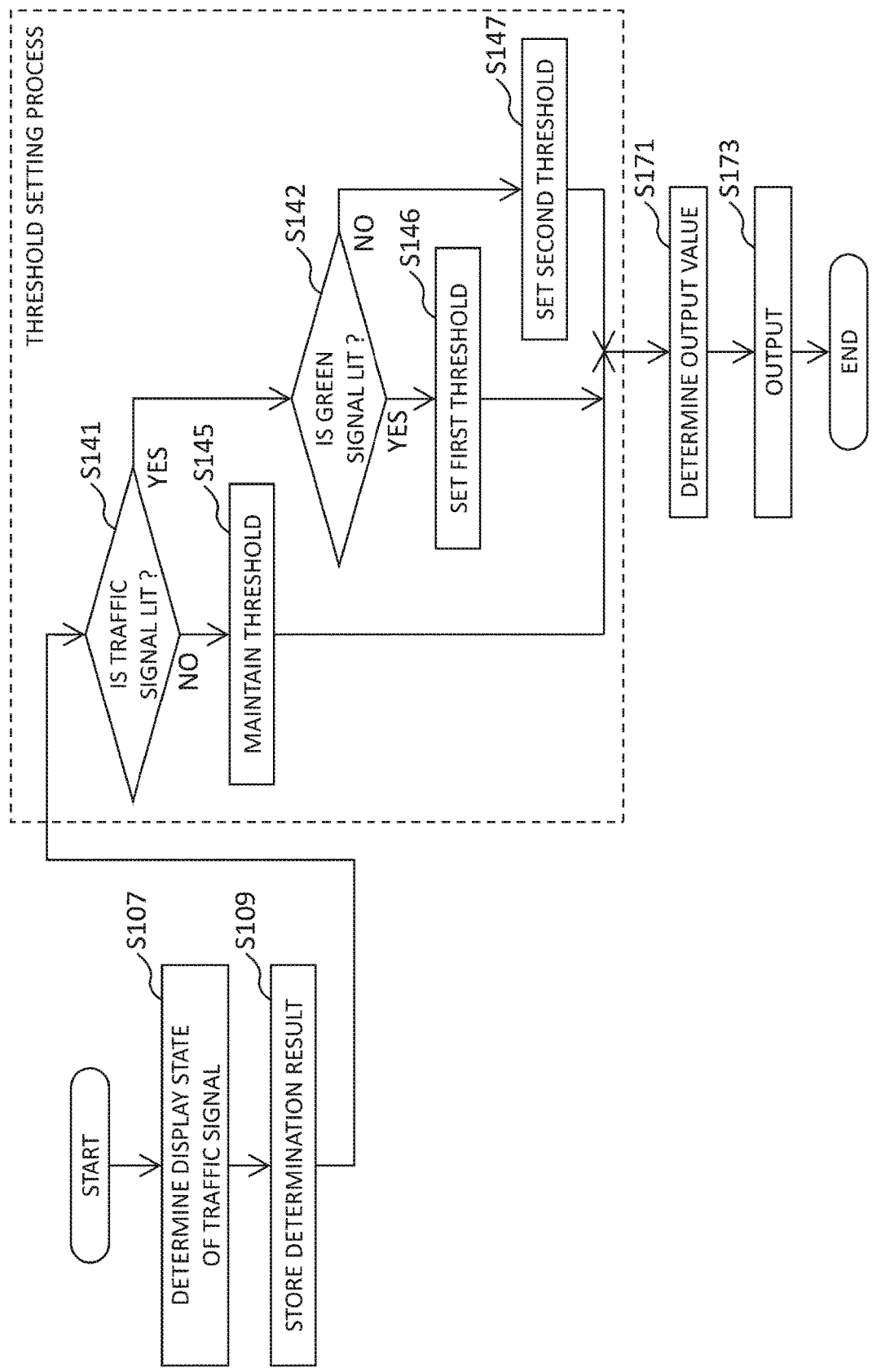
FIG. 2 is a flowchart illustrating a processing procedure of a traffic signal recognition device according to an embodiment of the disclosure.
Figure 3:
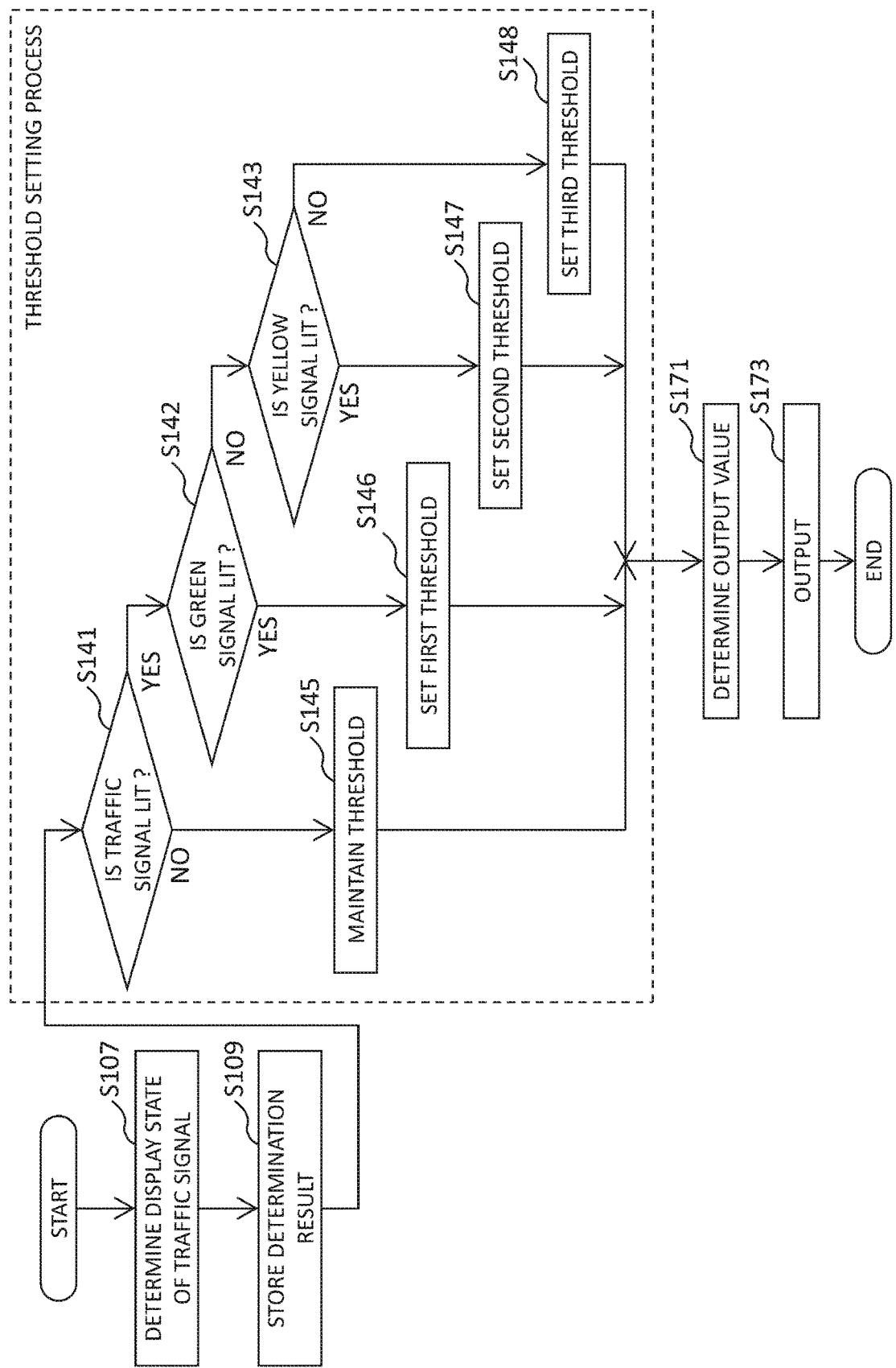
FIG. 3 is a flowchart illustrating a modified example of a processing procedure of a traffic signal recognition device according to an embodiment of the disclosure.

Next, a traffic signal recognition processing procedure by the traffic signal recognition device according to the present embodiment will be described with reference to the flowcharts of FIGS. 2 and 3. FIG. 2 is a flowchart illustrating a processing procedure of a traffic signal recognition device according to the present embodiment. FIG. 3 is a flowchart illustrating a modified example of a processing procedure of a traffic signal recognition device according to the present embodiment.

The traffic signal recognition process shown in FIGS. 2 and 3 may be executed every time the imaging unit 71 acquires an image, or may be executed every cycle the image processing is executed on the detection area after the imaging unit 71 acquires the image.

In step S107, the determination unit 150 determines the display state of the traffic signal based on the image captured by the imaging unit 71.

In step S109, the determination result storage unit 155 stores the display state of the traffic signal determined by the determination unit 150.

In step S141, the threshold setting unit 180 determines whether or not the traffic signal is lit. Specifically, the threshold setting unit 180 determines whether or not the traffic signal is lit by referring to the latest determination result among the result sequence stored in the determination result storage unit 155.

If the traffic signal is not lit (NO in step S141), the threshold setting unit 180 maintains the number threshold NC in step S145. If the traffic light is lit (YES in step S141), the process proceeds to step S142.

In step S142, the threshold setting unit 180 determines whether or not the green signal is lit. Specifically, the threshold setting unit 180 determines whether or not the latest determination result is a determination result that the display state is the permission display ("green signal") that allows a passage of the stop line corresponding to the traffic signal.

In a case where the green signal is lit (YES in step S142), the threshold setting unit 180 sets the first threshold as the number threshold NC, in step S146. In a case where the green signal is not lit (NO in step S142), the threshold setting unit 180 sets the second threshold smaller than the first threshold as the number threshold NC, in step S147.

If the green signal is not lit (NO in step S142), as shown in the flowchart of FIG. 3, the process may proceed to step S143 to determine whether or not the yellow signal is lit.

In a case where the yellow signal is lit (YES in step S143), the threshold setting unit 180 sets the second threshold as the number threshold NC, in step S147. In a case where the yellow signal is not lit (NO in step S143), the threshold setting unit 180 may set a third threshold smaller than the first threshold as the number threshold NC, in step S148. The third threshold may be smaller than the first threshold and larger than the second threshold.

After the setting of the number threshold NC is completed in step S145, step S146, step S147, and step S148, the output decision unit 190 determines the output value based on the result sequence stored in the determination result storage unit 155 in step S171.

In step S173, the output unit 160 outputs the display state of the traffic signal determined by the output decision unit 190. The output display state of the traffic signal is used, for example, in the vehicle control device 400.

By repeatedly executing the processes shown by the flowcharts of FIGS. 2 and 3, the number threshold NC is sequentially updated.

Effect of Embodiments

As described in detail above, a traffic signal recognition method and a traffic signal recognition device according to the present embodiment acquire a result sequence consisting of a plurality of determination results in time-series order obtained by determining a display state of a traffic signal based on a plurality of images of a traveling direction of a vehicle, set a first threshold as a number threshold if a specific determination result which is a latest determination result among the determination results constituting the result sequence is a determination result that the display state is a permission display that allows a passage of the stop line corresponding to the traffic signal, set a second threshold smaller than the first threshold as the number threshold if the specific determination result is other than a determination result that the display state is the permission display, and output the specific determination result if a number of determination results identical to the specific determination result is greater than the number threshold.

As a result, while suppressing the delay time from the actual transition of the display state of the traffic signal to the start of the process corresponding to the display state after the transition, it is possible to determine the display state of the traffic signal and to recognize the traffic signal, by referring to the plurality of images arranged in time-series order. In particular, it is possible to suppress the delay time of recognition of the traffic signal in a case where the traffic signal is in the display state other than the permission display as compared with the case where the traffic signal is the permission display. As a result, it is possible to accelerate the start of the process (for example, the process of giving a warning to the occupant, the process of braking the vehicle, etc.) corresponding to the display state other than the permission display.

Further, a traffic signal recognition method and a traffic signal recognition device according to the present embodiment may set the second threshold as the number threshold in a case where the specific determination result is a prohibition display or an intermediate display, for the traffic signal that displays at least one of the permission display, the prohibition display that prohibits a passage of the stop line, and the intermediate display displayed after the permission display and before the prohibition display. As a result, it is possible to suppress the delay time in recognizing the traffic signal in a case where the traffic signal is the intermediate display or the prohibition display as compared with the case where the traffic signal is the permission display.

Furthermore, a traffic signal recognition method and a traffic signal recognition device according to the present embodiment may set a third threshold smaller than the first threshold as the number threshold in a case where the specific determination result is a determination result that the display state is the prohibition display. As a result, it is possible to suppress the delay time in recognizing the traffic signal in a case where the traffic signal is the prohibition display as compared with the case where the traffic signal is the permission display.

Further, in a traffic signal recognition method and a traffic signal recognition device according to the present embodiment, the second threshold may be smaller than the third threshold. As a result, it is possible to suppress the delay time in recognizing the traffic signal in a case where the traffic signal is the intermediate display as compared with the case where the traffic signal is the prohibition display.

Furthermore, in a traffic signal recognition method and a traffic signal recognition device according to the present embodiment, a number of determination results constituting the result sequence may be larger than the number threshold. As a result, it is possible to store the number of determination results required to determine the output value, and it is possible to surely improve the recognition accuracy of the traffic signal.

Further, a traffic signal recognition method and a traffic signal recognition device according to the present embodiment may extract a determination result that the display state is unknown among the determination results constituting the result sequence as a first determination result, may extract a determination result immediately before the first determination result and a determination result immediately after the first determination result among the determination results constituting the result sequence excluding the determination results that the display state is unknown as a second determination result and a third determination result respectively, may replace the first determination result in the result sequence with the second determination result in a case where the second determination result is identical to the third determination result.

As a result, even in a situation where the display state of the traffic signal cannot be determined due to the flicker of the traffic signal, it is possible to reduce the time delay from the actual change of the display state of the traffic signal to the change of the output value.

Respective functions described in the above embodiment may be implemented by one or plural processing circuits. The processing circuits include programmed processing devices such as a processing device including an electric circuit and include devices such as an application specific integrated circuit (ASIC) and conventional circuit elements that are arranged to execute the functions described in the embodiment.

Although the contents of the disclosure have been described above with reference to the embodiment, the disclosure is not limited to these descriptions, and it will be apparent to those skilled in the art that various modifications and improvements can be made. It should not be construed that the disclosure is limited to the descriptions and the drawings that constitute a part of the present disclosure. On the basis of the present disclosure, various alternative embodiments, practical examples, and operating techniques will be apparent to those skilled in the art.

It is needless to mention that the disclosure also includes various embodiments that are not described herein. Therefore, the technical scope of the disclosure is to be defined only by the invention specifying matters according to the scope of claims appropriately obtained from the above descriptions.

REFERENCE SIGNS LIST

71 imaging unit
73 in-vehicle sensor
75 map information acquisition unit
100 controller
150 determination unit
155 determination result storage unit
160 output unit
180 threshold setting unit
190 output decision unit
400 vehicle control device

The invention claimed is:

1. A traffic signal recognition method comprising:
   acquiring a plurality of images by imaging multiple times a traffic signal in a traveling direction of a vehicle using an imaging unit mounted on the vehicle;
   acquiring a result sequence consisting of a plurality of determination results in time-series order obtained by determining a display state of the traffic signal for each image of the plurality of images;
   when setting a number threshold based on a specific determination result which is a latest determination result among the determination results constituting the result sequence,
      setting a first threshold as the number threshold in a case where the specific determination result is a determination result that the display state is a permission display that allows a passage of a stop line corresponding to the traffic signal, and
      setting a second threshold smaller than the first threshold as the number threshold in a case where the specific determination result is other than a determination result that the display state is the permission display; and
   outputting the specific determination result in a case where a number of determination results identical to the specific determination result is greater than the number threshold.

2. The traffic signal recognition method according to claim 1, further comprising:
   for the traffic signal that displays at least one of the permission display, a prohibition display that prohibits a passage of the stop line, and an intermediate display displayed after the permission display and before the prohibition display, setting the second threshold as the number threshold in a case where the specific determination result is the prohibition display or the intermediate display.

3. The traffic signal recognition method according to claim 2, further comprising:

setting a third threshold smaller than the first threshold as the number threshold in a case where the specific determination result is a determination result that the display state is the prohibition display.

4. The traffic signal recognition method according to claim 3, wherein the second threshold is smaller than the third threshold.

5. The traffic signal recognition method according to claim 1, wherein a number of determination results constituting the result sequence is larger than the number threshold.

6. The traffic signal recognition method according to claim 1, further comprising:

extracting a determination result that the display state is unknown among the determination results constituting the result sequence as a first determination result, extracting a determination result immediately before the first determination result and a determination result immediately after the first determination result among the determination results constituting the result sequence excluding the determination results that the display state is unknown as a second determination result and a third determination result respectively, replacing the first determination result in the result sequence with the second determination result in a case where the second determination result is identical to the third determination result.

7. A traffic signal recognition device comprising:

an imaging unit mounted on a vehicle and a controller, wherein the controller is configured to:

acquire a plurality of images by imaging multiple times a traffic signal in a traveling direction of the vehicle using the imaging unit;

acquire a result sequence consisting of a plurality of determination results in time-series order obtained by determining a display state of the traffic signal for each image of the plurality of images;

when setting a number threshold based on a specific determination result which is a latest determination result among the determination results constituting the result sequence, set a first threshold as the number threshold in a case where the specific determination result is a determination result that the display state is a permission display that allows a passage of a stop line corresponding to the traffic signal, and set a second threshold smaller than the first threshold as the number threshold in a case where the specific determination result is other than a determination result that the display state is the permission display; and output the specific determination result in a case where a number of determination results identical to the specific determination result is greater than the number threshold.

* * * * *